(12) United States Patent
White et al.

(10) Patent No.: US 8,918,808 B2
(45) Date of Patent: Dec. 23, 2014

(54) METHOD AND APPARATUS FOR PRESENTING MEDIA CONTENT

(75) Inventors: Scott White, Austin, TX (US); James Cansler, Pflugerville, TX (US); Charles Scott, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 937 days.

(21) Appl. No.: 12/027,580

(22) Filed: Feb. 7, 2008

(65) Prior Publication Data

US 2009/0204989 A1 Aug. 13, 2009

(51) Int. Cl.
| | |
|---|---|
| *H04N 21/482* | (2011.01) |
| *H04N 21/2662* | (2011.01) |
| *H04N 21/258* | (2011.01) |
| *H04N 21/4402* | (2011.01) |
| *H04N 21/45* | (2011.01) |
| *H04N 21/454* | (2011.01) |

(52) U.S. Cl.
CPC ..... *H04N 21/2662* (2013.01); *H04N 21/25808* (2013.01); *H04N 21/4402* (2013.01); *H04N 21/440263* (2013.01); *H04N 21/4516* (2013.01); *H04N 21/454* (2013.01)
USPC ............................................... 725/37; 725/38

(58) Field of Classification Search
None
See application file for complete search history.

(56) References Cited

U.S. PATENT DOCUMENTS

| | | | | |
|---|---|---|---|---|
| 5,610,653 | A | * | 3/1997 | Abecassis ...................... 348/170 |
| 5,953,485 | A | * | 9/1999 | Abecassis ...................... 386/278 |
| 6,981,045 | B1 | * | 12/2005 | Brooks .......................... 709/226 |
| 6,988,095 | B1 | * | 1/2006 | Dorfman ............................... 1/1 |
| 2003/0025836 | A1 | * | 2/2003 | An et al. ........................ 348/584 |
| 2005/0097604 | A1 | * | 5/2005 | Shintani et al. ................. 725/44 |
| 2006/0090179 | A1 | * | 4/2006 | Hsu et al. ......................... 725/17 |
| 2007/0011702 | A1 | | 1/2007 | Vaysman |
| 2007/0113246 | A1 | * | 5/2007 | Xiong .............................. 725/39 |
| 2007/0288986 | A1 | | 12/2007 | Candelore et al. |
| 2008/0288977 | A1 | * | 11/2008 | Howcroft et al. ............... 725/37 |

* cited by examiner

*Primary Examiner* — Cai Chen
(74) *Attorney, Agent, or Firm* — Guntin & Gust, PLC; Joseph Hrutka

(57) ABSTRACT

A system that incorporates teachings of the present disclosure may include, for example, a set top box having a controller to obtain display parameters associated with a display device, adjust a format of media content at the set top box based at least in part on the display parameters where the adjustment is of one or more portions of a display of the media content, and transmit the media content from the set top box to the display device. Other embodiments are disclosed.

22 Claims, 8 Drawing Sheets

100

200

400

METHOD AND APPARATUS FOR PRESENTING MEDIA CONTENT

FIELD OF THE DISCLOSURE

The present disclosure relates generally to communication systems and more specifically to a method and apparatus for presenting media content.

BACKGROUND

Display devices, such as televisions, can have a wide variety of display capabilities and characteristics, including high-definition capability, screen size, resolution, aspect ratio and so forth. To take advantage of these capabilities and characteristics, a user typically adjusts the display device upon initial set up of the media system which includes the display device. The selection of capabilities and characteristics during the initial set up is typically a time consuming process, and is often maintained by the user despite changes to the media system, such as implementation of a different set top box from a media service provider.

A user's adjustments to the display characteristics become a static feature that is applied by the display device to all media content presented thereon. This can result in failure to provide a desired or optimized viewing effect for certain media content.

DETAILED DESCRIPTION

In one embodiment of the present disclosure, a computer-readable storage medium operating in a set top box can have computer instructions for obtaining display parameters associated with a display device, adjusting a format of media content based at least in part on the display parameters where the adjustment is of less than an entire display of the media content by the display device, and transmitting the media content from the set top box to the display device.

In another embodiment of the present disclosure, a set top box can have a controller to obtain display parameters associated with a display device, adjust a format of media content at the set top box based at least in part on the display parameters where the adjustment is of one or more portions of a display of the media content, and transmit the media content from the set top box to the display device.

In another embodiment of the present disclosure, a server can have a controller to receive a query from a set top box for display parameters associated with display device coupled to the set top box where the query comprises device identification information associated with the display device, retrieve the display parameters based at least in part on the device identification information, and transmit the display parameters to the set top box, where a format of media content is adjusted at the set top box based at least in part on the display parameters, and where the adjustment is of less than an entire display of the media content on the display device.

In another embodiment of the present disclosure, a display device can have a controller to receive a request from a set top box for device identification information, transmit to the set top box the device identification information, and present media content received from the set top box, where display parameters are obtained by the set top box based at least in part on the device identification information, where a format of the media content is adjusted by the set top box based at least in part on the display parameters, and where the adjustment is of one or more portions of a display of the media content on the display device.

In another embodiment of the present disclosure, a method can involve obtaining display parameters at a set top box from a remote source where the display parameters are associated with a display device coupled to the set top box, adjusting a format of media content at the set top box based at least in part on the display parameters where the adjustment is of one or more portions of a display of the media content, and transmitting the media content from the set top box to the display device.

Figure 1:
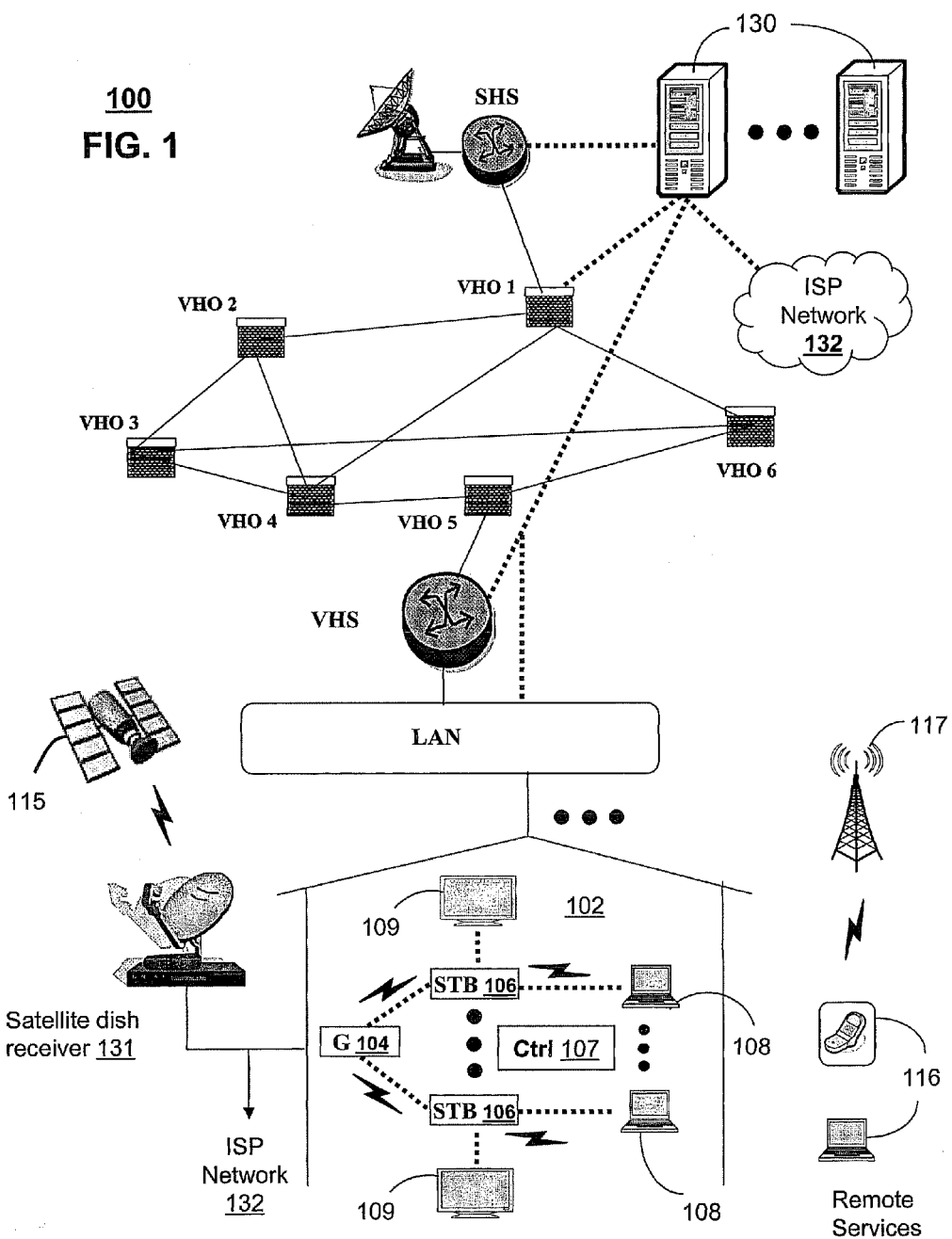
FIGS. 1-3 depict exemplary embodiments of communication systems that provide media services.

FIG. 1 depicts an exemplary embodiment of a first communication system 100 for delivering media content. The communication system 100 can represent an IPTV broadcast media system. In a typical IPTV infrastructure, there is at least one super head-end office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) or communication devices which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

In one embodiment, the media processor 106 can be an STB in communication with a display device 109, such as over a hardwire connection (e.g., a home network), wireless connection or both. In another embodiment, the display device 109 and the STB 106 can be in communication over a High-Definition Multimedia Interface (HDMI). In another embodiment, the STB 106 can be in communication with one or more servers 130 over a wired and/or wireless connection. The servers 130 can provide display information to the STB 106 where the display information is associated with the display device 109, such as from data stored in a memory of the server 130 or from querying one or more sources for such information, including querying databases or websites associated with the display device.

In another embodiment, the STB 106 can have components, and can perform techniques, for transcoding (e.g., direct digital-to-digital conversion), transrating (e.g., coding to a lower bitrate without changing video formats), and/or format adjusting of the media content, or a portion thereof, to be presented on the display device 109.

The IPTV media system can be coupled to the computing devices or servers 130, a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.).

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems. Communication system 100 can also operate as an IP Multimedia Subsystem (IMS) conforming in part to protocols defined by standards bodies such as 3GPP (Third Generation Partnership Protocol).

Figure 2:
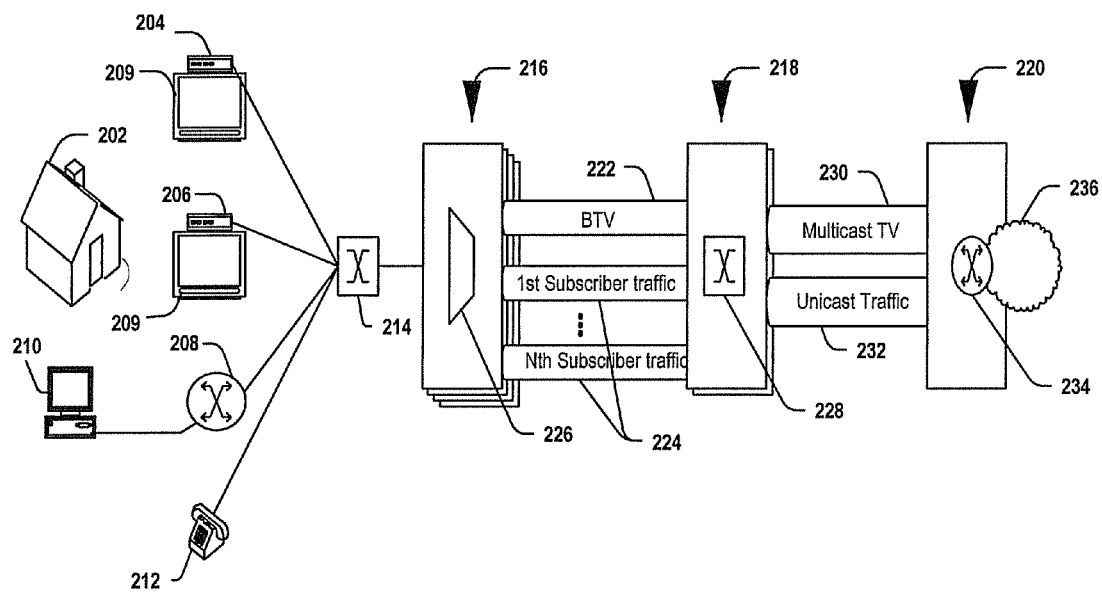

FIG. 2 depicts an exemplary embodiment of a second communication system 200 for delivering media content. Communication system 200 can be overlaid or operably coupled with communication system 100 as another representative embodiment of said communication system. The system 200 can include a distribution switch/router system 228 at a central office 218. The distribution switch/router system 228 can receive video data via a multicast television stream 230 from a second distribution switch/router 234 at an intermediate office 220. The multicast television stream 230 can include Internet Protocol (IP) data packets addressed to a multicast IP address associated with a television channel. The distribution switch/router system 228 can cache data associated with each television channel received from the intermediate office 220.

The distribution switch/router system 228 can also receive unicast data traffic from the intermediate office 220 via a unicast traffic stream 232. The unicast traffic stream 232 can include data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

In one embodiment, the set-top box devices 204, 206 can be in communication with a display device 209, such as over a hardwire connection (e.g., a home network), wireless connection or both. In another embodiment, the set-top box devices 204, 206 can be in communication over a High-Definition Multimedia Interface (HDMI). In another embodiment, the set-top box devices 204, 206 can be in communication with one or more back-end servers (not shown) over a wired and/or wireless connection. The servers can provide display information to the set-top box devices 204, 206 where the display information is associated with the display device 209, such as from data stored in a memory of the server or from querying one or more sources for such information, including querying databases or websites associated with the display device. In another embodiment, the set-top box devices 204, 206 can have components, and can perform techniques, for transcoding (e.g., direct digital-to-digital conversion), transrating (e.g., coding to a lower bitrate without changing video formats), and/or format adjusting of the media content, or a portion thereof, to be presented on the display device 209.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, can receive a channel change command from an input device, such as a remoter control device. The channel change command can indicate selection of an IPTV channel. After receiving the channel change command, the set-top box device 204 can generate channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

Figure 3:
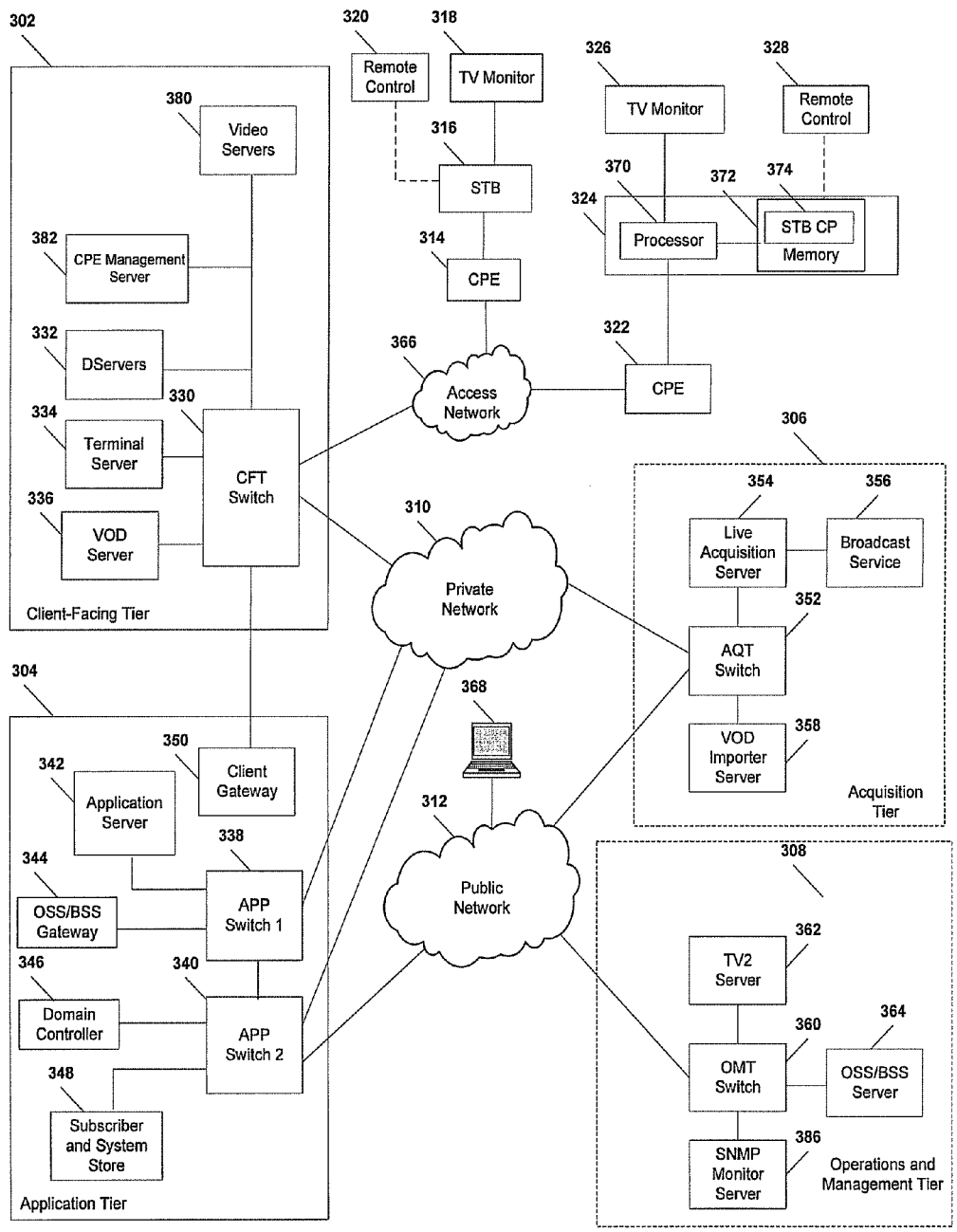

FIG. 3 depicts an exemplary embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 322.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an exemplary embodiment, the client-facing tier 302 can be coupled to the CPE 314, 322 via fiber optic cables. In another exemplary embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a video-on-demand (VOD) server 336 that stores or provides VOD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VOD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VOD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VOD server 336 at the client-facing tier 302 via the private network 310. Additionally, at the acquisition tier 306, the video-on-demand (VOD) importer server 358 can receive content from one or more VOD sources outside the IPTV system 300, such as movie studios and programmers of non-live content. The VOD importer server 358 can transmit the VOD content to the AQT switch 352, and the AQT switch 352, in turn, can communicate the material to the CFT switch 330 via the private network 310. The VOD content can be stored at one or more servers, such as the VOD server 336.

When users issue requests for VOD content via the set-top box devices 316, 324, the requests can be transmitted over the access network 366 to the VOD server 336, via the CFT switch 330. Upon receiving such requests, the VOD server 336 can retrieve the requested VOD content and transmit the content to the set-top box devices 316, 324 across the access network 366, via the CFT switch 330. The set-top box devices 316, 324 can transmit the VOD content to the television monitors 318, 326. In an illustrative embodiment, video or audio portions of VOD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

It should be apparent to one of ordinary skill in the art from the foregoing media system embodiments that other suitable media systems for distributing broadcast media content, as well as peer-to-peer exchange of content, can be applied to the present disclosure.

Figure 4:
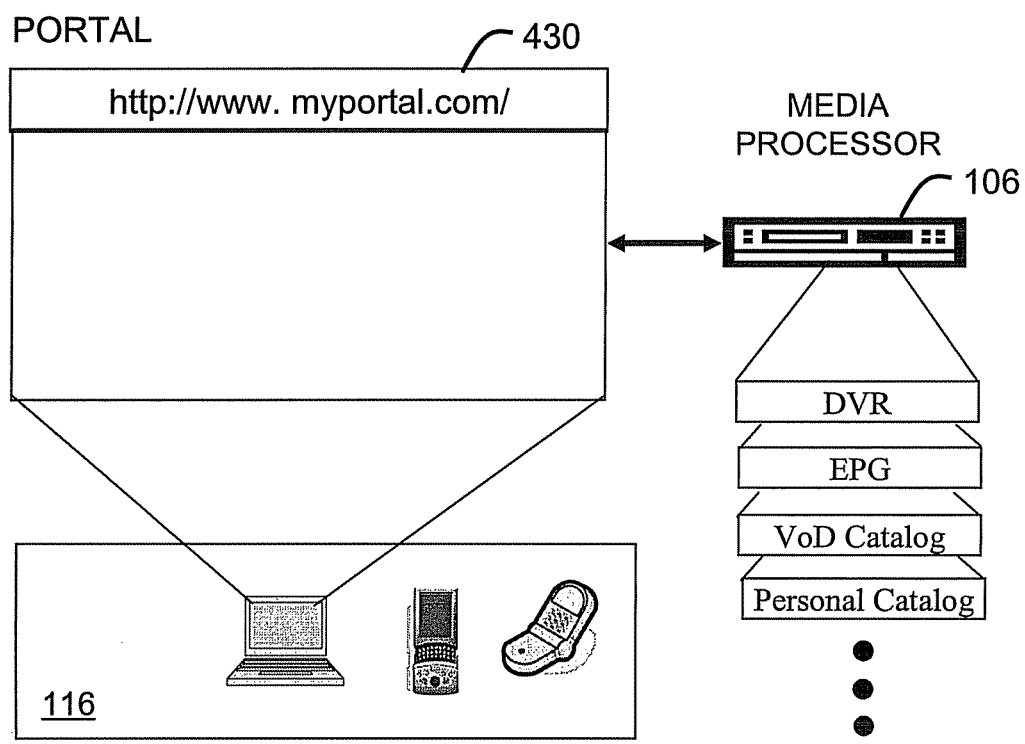
FIG. 4 depicts an exemplary embodiment of a portal interacting with at least one among the communication systems of FIGS. 1-3.

FIG. 4 depicts an exemplary embodiment of a portal 430. The portal 430 can be used for managing services of communication systems 100-300. The portal 430 can be accessed by a Uniform Resource Locator (URL) with a common Internet browser such as Microsoft's Internet Explorer using an Internet-capable communication device such as references 108, 116, or 210 of FIGS. 1-2. The portal 430 can be configured to access a media processor such as references 106, 204, 206, 316, and 324 of FIGS. 1-3 and services managed thereby such as a DVR, an Electronic Programming Guide (EPG), VOD catalog, a personal catalog stored in the STB (e.g., personal videos, pictures, audio recordings, etc.), and so on.

Figure 5:
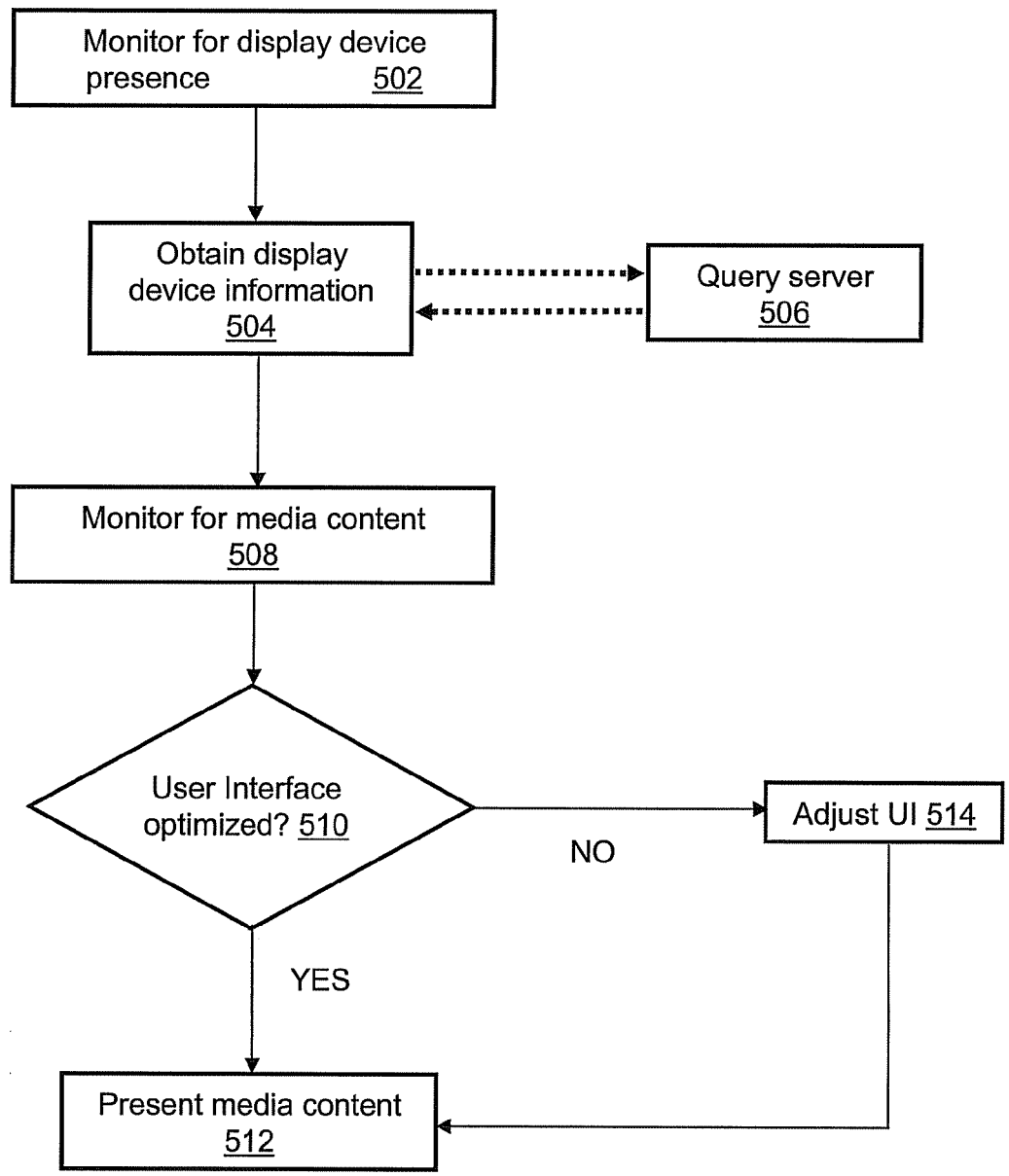
FIG. 5 depicts an exemplary method operating in portions of the communication systems of FIGS. 1-3.

FIG. 5 depicts an exemplary method 500 operating in portions of one or more of the communication systems 100-300. Method 500 has variants as depicted by the dashed lines. It would be apparent to an artisan with ordinary skill in the art that other embodiments not depicted in FIG. 5 are possible without departing from the scope of the claims described below. For convenience, the term STB 106 as used in the following paragraphs can mean any of the media processors or STBs 106, 204, 206, 316, 324 singly or in combination, and the term display device 109 can mean any of devices 109, 209, 318 and 326 singly or in combination.

Method 500 begins with step 502 where the STB 106 can monitor for the presence of the display device 109. The monitoring can occur at designated times, such as when the STB 106 is first connected (or re-connected) to the display device 109, including through use of a HDMI connection. In one embodiment, the monitoring can occur each time one or both of the STB 106 and display device 109 are powered up. Other time frames or schedules for monitoring are also contemplated by the present disclosure, such as according to a pre-determined schedule after a presence of the display device 109 is first recognized. The presence monitoring can be performed in a number of different ways, including sending queries or pings from one of the STB 106 or display device 109 to the other, and waiting for a response.

In step 504, the STB 106 can obtain display device information (e.g., identification information) or characteristics (e.g., parameters) associated with the display device 109, such as the screen size, aspect ratio capability, video filtering, contrast ratio capability, high-definition compatibility and so forth. In one embodiment, the STB 106 can retrieve the device parameters from the display device 109. In another embodiment as in step 506, the STB 106 can query a remote source for some or all of the device parameters, such as querying a backend server 130 that has a database of such information or other sources including databases associated with the manufacturer of the display device.

In one embodiment, the query can be based on data or information provided by the display device 109, such as a manufacturer, a make, a model and so forth. In another embodiment, the query can be based on data or information provided by a user, such as where the user inputs the manufacturer, make, and/or model of the display device 109 into the STB 106. For example, where the display device 109 is an analog device, the user can provide device identification information to the STB 106 so that the STB can retrieve the device parameters from a remote server. In another embodiment, the user can provide the device parameters to the STB 106 through a user interface of the STB. A combination of user-supplied data and device-supplied data can also be used to perform the query and/or to compile the device parameters. The present disclosure also contemplates the STB 106 storing the display device parameters so that if the display device presence is detected at some later time, the information is readily available.

In step 508, the STB 106 can monitor for media content to be presented and/or being presented on the display device 109. The media content can be in various forms, including regularly scheduled programming on a television channel, video-on-demand content, removable storage content (e.g., DVD content), DVR content, and so forth. The type of content can vary, including movies, sports events, television shows, and so forth. The monitoring can include determining or otherwise retrieving information associated with media content characteristics, including color depth, frame rate, any compression techniques and so forth.

In step 510, the STB 106 can determine if the user interface or display to be presented on the display device 109 has been optimized, such as for the particular media content being presented. In one embodiment, the determination of optimization can be made for one or more portions of the display. The optimization can be based on the display device parameters, as well as the characteristics of the media content. If optimization is not needed or is not desired, such as where an adjustment to obtain optimization falls below a pre-determined threshold, then in step 512 the media content can be presented on the display device 109 by the STB 106.

If on the other hand, the user interface optimization is desired then in step 514 the format of the media content can be adjusted by the STB 106 so that the user interface or display presented on the display device 109 is altered, and then the media content can be presented in step 512. The STB 106 can determine a better format for rendering the display of the video content, and can thereafter render the display in that format on the display device 109. For example, based upon the STB's understanding of the parameters of the display device 109 and/or the media content, the STB 106 can optimize the display on that display device. For instance, the STB 106 can scale the user interface for optimal use based on the screen size of the display device 109 and/or can introduce increased degrees of visual richness on the display on a larger display device 109. The present disclosure contemplates other display or user interface characteristics being utilized and/or adjusted, including resolution, aspect ration, text size, background image complexity, level of animation, and so forth. In another embodiment, additional display devices can be connected to the STB 106 and the STB can adjust the display or user interface delivered to each of the display devices as appropriate for the display platform (e.g., based on the parameters of the display device).

In one embodiment, the adjustment of the display can be made to one or more portions of the display. In another embodiment, different formats of the media content can be utilized for different portions of the display. For example, one portion of the display can have an increased color depth while a second portion of the display can have a decreased resolution. The particular number of portions and configuration of adjustments to the format can be based on a number of factors, including the type of media content being presented (e.g., a sporting event or a movie) and user preferences. In one embodiment, the one or more portions of the display that have their formats adjusted can be determined based at least in part on the location of the portions with respect to the display, such as a center area of the display. In another embodiment, the one or more portions of the display that have their formats adjusted can be determined based at least in part on scene information, such as adjusting the color depth in proximity to the actors being shown in a movie but maintaining the color depth for portions of the display that are remote from the actors.

In another embodiment, the determination and application of user interface optimization can be limited to particular types of media content. For instance, the user can select optimization for only sporting events. The selection of implementing the adjustment optimization can also be made by other than the user, including the STB 106, such as where a threshold quality is monitored for and maintained. In one embodiment, the STB 106 can adjust the current format of the media content to a targeted format using techniques including transcoding (e.g., decoding and decompressing the original data to a raw intermediate format and then re-encoding into a target format), transrating the format and/or transsizing the format (e.g., changing the picture size of video).

Figure 6:
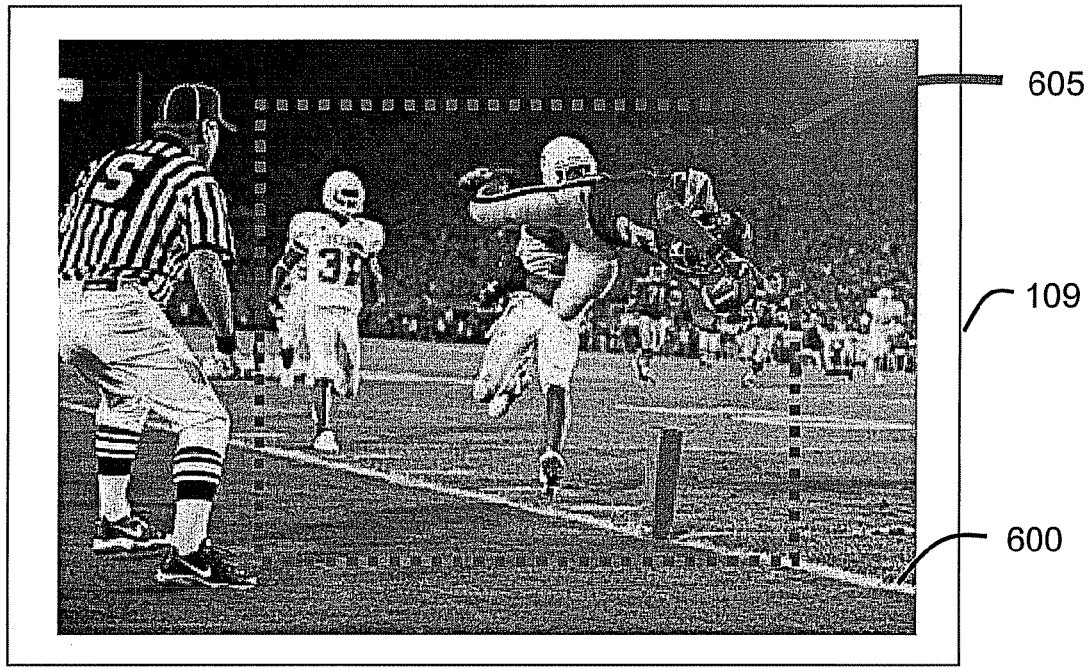
FIGS. 6 and 7 depict an exemplary user interface presented by the method of FIG. 5.
Figure 7:
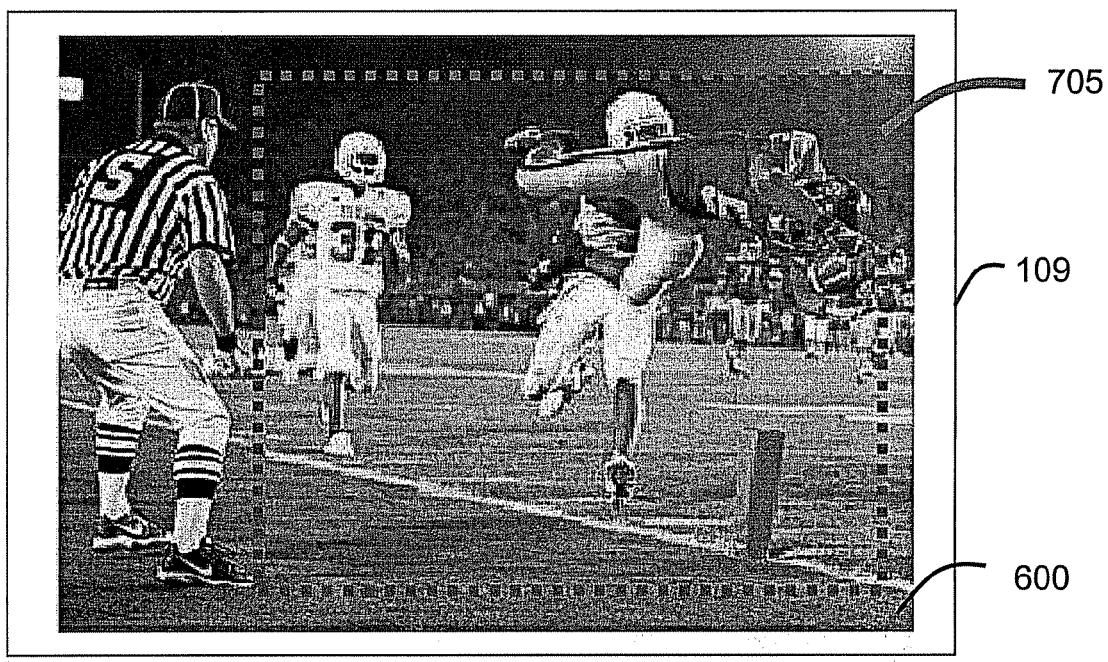

Referring additionally to FIGS. 6 and 7, a user interface or display 600 is shown for the display device 109. The display 600 is of media content for a sporting event, and has an area of interest 605 which is a portion of the display (i.e., less than the entire display). In this exemplary embodiment, the area of interest 605 is a single area that is in proximity to the more significant action of the sporting event (e.g., in proximity to the football or some other viewer focal point). In another embodiment, a plurality of portions of the user interface or display can be adjusted by the STB 106 for optimizing viewing on the display device 109. In step 514, the STB 106 can adjust an area of interest 705 of the display 600 to facilitate viewing, such as based on characteristics of the media content and/or display device information.

In this exemplary embodiment, the area of interest 705 corresponds to the area of interest 605, and is enlarged to facilitate the viewing of the sporting event. However, the present disclosure contemplates other adjustments to the area of interest 705 or adjustments to other portions of the display 600. For instance, the portion of the display corresponding to area of interest 705 can be adjusted as to color depth, aspect ration, graphics, text size, background image complexity, level of animation, and so forth. In one embodiment, different portions of the display or user interface can have different adjustments performed, such as increasing color depth in portions of the display that are deemed more significant to a viewer while lessening background image complexity in portions of the display that are deemed less significant to the viewer. Additionally, the adjustments to the user interface can be video, audio and/or graphics adjustments.

In one exemplary embodiment of the present disclosure, the adjustment to the format can be performed at the set top box which results in an adjustment to the display when presented at the television. The adjustment to the format can result in an adjustment to only a portion of the display when presented by the television.

Upon reviewing the aforementioned embodiments, it would be evident to an artisan with ordinary skill in the art that said embodiments can be modified, reduced, or enhanced without departing from the scope and spirit of the claims described below. In one embodiment, user interface adjustments can be repeated for multiple media content, such as based on a type of media content. For instance, one or both of the color depth and aspect ration can be increased for a portion of the display, such as the center area of the display for all sporting events presented on the display device, since the camera typically maintains the significant activity in the center of viewing (e.g., follows the football). The particular color depth and/or aspect ration adjustment made by the STB 106 can be based on the display device information associated with the display device 109 that the STB has retrieved, such as from the display device and/or a back-end server.

In another embodiment, the adjustments made to the display can be based on a combination of the device parameters, the media content and user preferences. For instance, the STB 106 can retrieve or otherwise obtain user preferences as to adjustments to be made to the display, such as color depth adjustments in proximity to actors shown in the display.

Other suitable modifications that can be applied to the present disclosure without departing from the scope of the claims below. Accordingly, the reader is directed to the claims section for a fuller understanding of the breadth and scope of the present disclosure.

Figure 8:
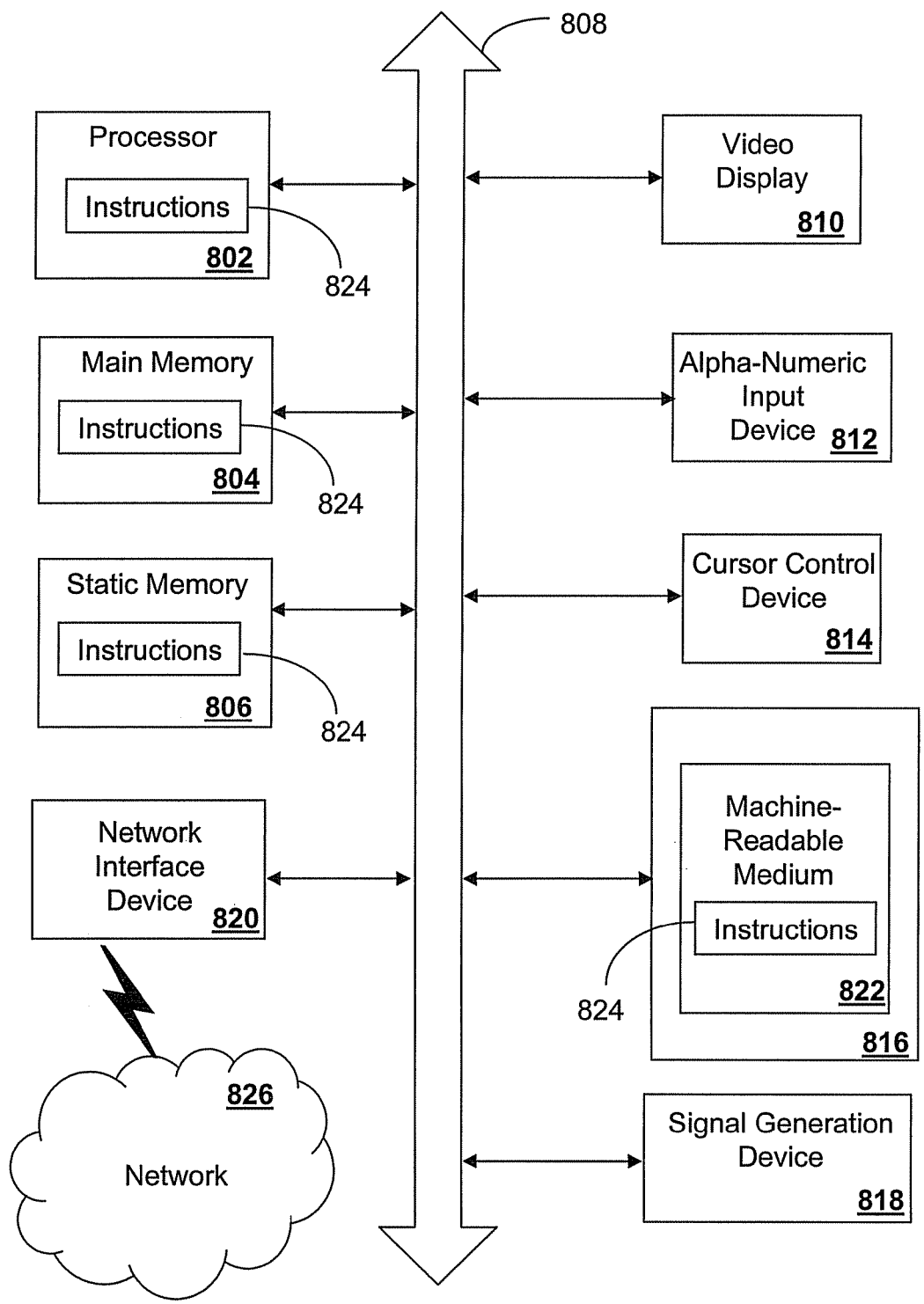
FIG. 8 is a diagrammatic representation of a machine in the form of a computer system within which a set of instructions, when executed, may cause the machine to perform any one or more of the methodologies discussed herein.

FIG. 8 depicts an exemplary diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-readable storage device having computer instructions embedded therein, wherein the computer instructions, responsive to being executed by a processor of a set-top box, cause the processor to perform operations comprising:
obtaining display parameters associated with a display device having a display area;
monitoring media content being presented by the set-top box to the display device to determine media content characteristics;
determining if the display device is optimized based on the display parameters and the media content characteristics; and
responsive to determining that the display device is not optimized:
determining a format for a first portion of the display area, wherein the first portion comprises a sub-portion of the display area, and wherein the first portion contains a focal point related to a detected action taking place in the media content;
adjusting a format of media content of the first portion, wherein the media content comprises video content that is presented according to the display parameters and the media content characteristics, wherein the adjusting of the format of the first portion of the display area results in adjusted media content, wherein the format of the media content in relation to a remaining portion of the display area is not adjusted resulting in non-adjusted media content; and
generating and providing control signals that cause the display device to simultaneously present the non-adjusted media content and the adjusted media content without an overlap of the first portion and the remaining portion of the display area and without changing a size of any object displayed in the first portion of the display area.

2. The computer-readable storage device of claim 1, wherein the adjusting of the format of the media content includes adjusting one of a color depth, an aspect ratio, a background image complexity, or a combination thereof.

3. The computer-readable storage device of claim 1, wherein the detected action of the first portion is based on scene information associated with the video content, and wherein the adjusting of the format of media content of the first portion comprises transcoding of the media content.

4. The computer-readable storage device of claim 3, comprising computer instructions which, responsive to being executed by the processor at the set-top box, cause the processor to perform operations comprising:
obtaining device identification information associated with the display device from one of the display device or a user; and
performing a query based on the device identification information.

5. The computer-readable storage device of claim 1, wherein the first portion of the display area comprises a first sub-portion and a second sub-portion, and further comprising computer instructions for performing a first adjustment to a first sub-portion of media content presented therein and a second adjustment to a second sub-portion of the media content presented therein, wherein the first adjustment and the second adjustment change different media content characteristics of the first sub-portion of media content and the second sub-portion of media content.

6. The computer-readable storage device of claim 1, wherein the first portion of the display area comprises an area in proximity to an actor presented in the media content, and wherein the adjustment is to a color depth in the area of the display in proximity to the actor.

7. The computer-readable storage device of claim 1, comprising computer instructions which, responsive to being executed by the processor at the set top box, cause the processor to perform operations comprising performing the adjusting of the format of the media content of the first portion based on a user preference.

8. A set top box device, comprising:
a memory to store instructions; and
a processor coupled to the memory, wherein responsive to executing the instructions, the processor performs operations rising:
receiving display parameters associated with a display device having a display area;
monitoring media content presented to the display device to determine media content characteristics, wherein the media content comprises video content displaying an object;
determining a quality threshold for presentation of the media content at the display device;
determining if the display device satisfies the quality threshold based on the display parameters and the media content characteristics; and
responsive to determining that the display device does not satisfy the quality threshold:
determining a format for a first portion of the display area that satisfies the quality threshold, wherein the first portion comprises a sub-portion of the display area, and wherein the first portion of the display area is selected based on a location of the object in the video content;
adjusting a format of media content of the first portion based on the display parameters and the media content characteristic, wherein the adjusting of the format of the media content is performed on the first portion of the display area that is less than an entirety of the display area resulting in adjusted media content, wherein the format of the media content in a remaining portion of the display area is not adjusted resulting in non-adjusted media content; and
simultaneously presenting the non-adjusted media content and the adjusted media content via the display device without an overlap of the first portion and the remaining portion of the display area and without enlarging a size of the object in the first portion.

9. The set top box device of claim 8, wherein the first portion includes a plurality of portions, and wherein the operations further comprise adjusting a format of at least two of the plurality of portions based on changes to different media content characteristics.

10. The set top box device of claim 9, wherein one of the media content characteristics is a color depth.

11. The set top box device of claim 8, wherein the operations further comprise querying a remote server to obtain at least a portion of the display parameters, and wherein the simultaneously presenting of the non-adjusted media content and the adjusted media content comprises the remaining portion of the display area surrounding the first portion of the display area so that an inner boundary of the remaining portion of the display area is adjacent to an outer boundary of the first portion of the display area.

12. The set top box device of claim 11, wherein the operations further comprise:

obtaining device identification information associated with the display device from one of the display device or a user; and performing a query based on the device identification information.

13. The set top box device of claim 8, wherein the adjusting of the format of the media content includes adjusting one of a color depth, an aspect ratio, a text size, a background image complexity, a level of animation, or a combination thereof.

14. The set top box device of claim 9, wherein one of the media content characteristics is a resolution.

15. The set top box device of claim 8, wherein the operations further comprise adjusting the format of the media content for the first portion of the display by increasing a color depth in proximity to the object.

16. A display device, comprising:
a memory having computer instructions; and
a controller coupled to the memory, wherein executing the computer instructions causes the controller to perform operations comprising:
   obtaining display parameters of the display device;
   monitoring media content received by the display device to determine media content characteristics;
   determining a quality threshold for presentation of the media content at the display device;
   determining if the display device satisfies the quality threshold; and
   responsive to determining that the display device does not satisfy the quality threshold:
      determining a format for a first portion of the display area that satisfies the quality threshold based on the display parameters and the media content characteristics, wherein the first portion comprises a sub-portion of the display device, and wherein the first portion of the display device is selected based on a location of an object in the media content;
      adjusting a format of the media content of the first portion, wherein the media content comprises video content that is presented according to the display parameters and the media content characteristics resulting in adjusted media content, wherein a format of the media content in a remaining portion of the display is non-adjusted resulting in non-adjusted media content, and wherein the first portion is adjusted without changing a size of the object; and
   simultaneously presenting the non-adjusted media content and the adjusted media content without an overlap of the first portion and the remaining portion of the display.

17. The display device of claim 16, wherein the first portion includes a plurality of portions, and wherein the adjustment to the format is of at least two of the plurality of portions based on changes to different media content characteristics.

18. The display device of claim 17, wherein one of the media content characteristics is one of a color depth, an aspect ratio, a text size, a background image complexity, a level of animation, or a combination thereof.

19. The display device of claim 16, wherein the adjusting of the format is based on scene information in the first portion of the display.

20. A method, comprising:
obtaining, by a system comprising a processor, display parameters at a set-top box from a remote source, the display parameters being associated with a display device coupled to the set-top box;
monitoring, by the system, media content being presented by the set-top box to determine media content characteristics, wherein the media content comprises video content displaying an object;
determining a quality threshold for presentation of the media content at the display device;
determining, by the system, if the display device satisfies the quality threshold based on the display parameters and the media content characteristics; and
responsive to determining that the display device does not satisfy the quality threshold:
   determining, by the system, a format for a first portion of a display area of the display device, wherein the first portion comprises a sub-portion of the display area, and wherein the first portion of the display area is selected based on a focal point of a viewer with respect to the video content;
   generating, by the system, an adjusted media content by adjusting a format of media content at the set-top box based on the display parameters and the media content characteristics, the adjusting of the format of the first portion resulting in adjusted media content, and wherein the format of the media content in a remaining portion of the display is not adjusted resulting in non-adjusted media content; and
   transmitting, by the set-top box, the non-adjusted media content, the adjusted media content, and control signals to the display device causing the display device to simultaneously present the non-adjusted media content and the adjusted media content without overlap of the first portion and the remaining portion of the display and without increasing a size of the object appearing in the first portion of the display.

21. The method of claim 20, wherein the adjusting of the format of the first portion of the display includes adjusting one of a color depth, an aspect ratio, a background image complexity, or a combination thereof, of the first portion of the display.

22. The method of claim 20, wherein the first portion includes a plurality of portions of the display of the media content, and wherein the adjusting of the format is of at least two of the plurality of portions based on changes to different media content characteristics.

* * * * *